US010031830B2

(12) United States Patent
Brodsky et al.

(10) Patent No.: US 10,031,830 B2
(45) Date of Patent: Jul. 24, 2018

(54) APPARATUS, SYSTEM, AND METHOD FOR DATABASE MANAGEMENT EXTENSIONS

(75) Inventors: Stephen Andrew Brodsky, Los Gatos, CA (US); Holger Karn, Aidlingen (DE); Kevin Michael McBride, Mountain View, CA (US); Peter Wansch, San Jose, CA (US); Maryela Evelin Weihrauch, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 11/549,196

(22) Filed: Oct. 13, 2006

(65) Prior Publication Data
US 2008/0091978 A1    Apr. 17, 2008

(51) Int. Cl.
*G06F 7/00* (2006.01)
*G06F 17/00* (2006.01)
*G06F 11/34* (2006.01)
*G06F 17/30* (2006.01)

(52) U.S. Cl.
CPC .... *G06F 11/3466* (2013.01); *G06F 17/30306* (2013.01); *G06F 2201/80* (2013.01); *G06F 2201/81* (2013.01)

(58) Field of Classification Search
CPC ............. G06F 11/3072; G06F 11/3089; G06F 11/3452
USPC ............................................. 707/9
See application file for complete search history.

(56) References Cited

U.S. PATENT DOCUMENTS

| | | | |
|---|---|---|---|
| 5,239,663 A * | 8/1993 | Faudemay et al. | |
| 5,301,317 A * | 4/1994 | Lohman et al. | |
| 5,452,449 A | 9/1995 | Baldwin, Jr. et al. | |
| 5,668,928 A | 9/1997 | Groner | |
| 5,671,416 A | 9/1997 | Elson | |
| 5,828,844 A * | 10/1998 | Civanlar ............. | H04L 12/4608 370/395.52 |
| 6,063,133 A | 5/2000 | Li et al. | |
| 6,275,825 B1 | 8/2001 | Kobayashi et al. | |
| 6,378,126 B2 | 4/2002 | Tang | |
| 6,442,711 B1 | 8/2002 | Sasamoto et al. | |
| 6,457,172 B1 | 9/2002 | Carmichael et al. | |
| 6,496,833 B1 | 12/2002 | Goldberg et al. | |
| 6,681,232 B1 | 1/2004 | Sistanizadeh et al. .... | 707/104.1 |
| 6,760,905 B1 | 7/2004 | Hostetter et al. | |
| 6,950,825 B2 | 9/2005 | Chang et al. ................. | 707/100 |

(Continued)

OTHER PUBLICATIONS

Leonidas Lymberpoulos; An Adaptive Policy Based Framework for Network Services Management; 2003; Journal of Network and Systems Management; p. 277-303.*

(Continued)

*Primary Examiner* — Mariela Reyes
*Assistant Examiner* — Jermaine Mincey
(74) *Attorney, Agent, or Firm* — David W. Victor; Konrad, Raynes, Davda & Victor LLP

(57) ABSTRACT

An apparatus, system, and method are provided for evaluating database accesses. The apparatus may comprise a computer program that causes a computer system to exchange profiling data between a client application module and a database module; execute a database access; determine a database access policy violation at a detection point module; and selectively request context information from a context point module related to the database access.

22 Claims, 5 Drawing Sheets

(56) References Cited

U.S. PATENT DOCUMENTS

| | | | |
|---|---|---|---|
| 6,957,439 | B1 | 10/2005 | Lewallen |
| 7,010,538 | B1 | 3/2006 | Black .......................... 707/100 |
| 7,080,077 | B2* | 7/2006 | Ramamurthy et al. ....... 707/754 |
| 7,085,786 | B2* | 8/2006 | Carlson et al. ............... 707/609 |
| 7,107,269 | B2* | 9/2006 | Arlein et al. ................ 705/26.5 |
| 7,152,228 | B2 | 12/2006 | Goodwin et al. |
| 7,155,705 | B1 | 12/2006 | Hershberg et al. |
| 7,222,333 | B1 | 5/2007 | Mor et al. |
| 7,430,549 | B2 | 9/2008 | Zane et al. |
| 2001/0011371 | A1 | 8/2001 | Tang |
| 2002/0069261 | A1* | 6/2002 | Bellare et al. ................ 709/218 |
| 2002/0112044 | A1 | 8/2002 | Hessmer et al. |
| 2002/0188562 | A1* | 12/2002 | Igarashi et al. ................ 705/40 |
| 2003/0066056 | A1 | 4/2003 | Petersen et al. |
| 2003/0074355 | A1* | 4/2003 | Menninger et al. .............. 707/9 |
| 2003/0093471 | A1* | 5/2003 | Upton ..................... G06F 9/541 |
| | | | 709/203 |
| 2003/0188187 | A1 | 10/2003 | Uchida |
| 2003/0208505 | A1 | 11/2003 | Mullins et al. |
| 2004/0024762 | A1* | 2/2004 | Agarwal et al. .................. 707/9 |
| 2004/0064453 | A1* | 4/2004 | Ruiz et al. ......................... 707/9 |
| 2004/0194068 | A1 | 9/2004 | Warren et al. |
| 2004/0243692 | A1* | 12/2004 | Arnold et al. ................ 709/220 |
| 2005/0015356 | A1 | 1/2005 | Ireland et al. |
| 2005/0022029 | A1 | 1/2005 | Potter et al. |
| 2005/0028134 | A1 | 2/2005 | Zane et al. |
| 2005/0033779 | A1* | 2/2005 | Seki et al. ..................... 707/202 |
| 2005/0050069 | A1* | 3/2005 | Vaschillo et al. ............. 707/100 |
| 2005/0060441 | A1 | 3/2005 | Schmisseur |
| 2005/0081107 | A1 | 4/2005 | DeWitt, Jr. et al. |
| 2005/0086579 | A1 | 4/2005 | Leitner et al. |
| 2005/0091638 | A1 | 4/2005 | Bley |
| 2005/0108206 | A1 | 5/2005 | Lam et al. |
| 2005/0125418 | A1* | 6/2005 | Brewer et al. ................... 707/10 |
| 2005/0262086 | A1* | 11/2005 | Ta et al. ........................... 707/9 |
| 2005/0262135 | A1 | 11/2005 | White |
| 2006/0020933 | A1 | 1/2006 | Pasumansky et al. |
| 2006/0026042 | A1 | 2/2006 | Awaraji et al. |
| 2006/0085400 | A1 | 4/2006 | Minore et al. |
| 2006/0106786 | A1* | 5/2006 | Day et al. .......................... 707/4 |
| 2006/0117014 | A1 | 6/2006 | Qi |
| 2006/0143594 | A1 | 6/2006 | Grimaldi |
| 2006/0149739 | A1* | 7/2006 | Myers ................................ 707/9 |
| 2006/0155720 | A1 | 7/2006 | Feinberg |
| 2006/0206539 | A1* | 9/2006 | Thompson .................... 707/202 |
| 2006/0212487 | A1* | 9/2006 | Kennis et al. ................ 707/200 |
| 2006/0212559 | A1 | 9/2006 | Turnbull et al. |
| 2006/0248047 | A1 | 11/2006 | Grier et al. |
| 2007/0006188 | A1 | 1/2007 | Schroth et al. |
| 2007/0030853 | A1* | 2/2007 | Rogers ................ H04L 41/5009 |
| | | | 370/395.21 |
| 2007/0050343 | A1 | 3/2007 | Siddaramappa et al. |
| 2007/0055647 | A1 | 3/2007 | Mullins et al. |
| 2007/0168915 | A1* | 7/2007 | Fabbio ................ G06F 11/0709 |
| | | | 717/101 |
| 2007/0174346 | A1* | 7/2007 | Brown et al. ................. 707/200 |
| 2008/0120281 | A1 | 5/2008 | Marceau et al. |
| 2008/0319959 | A1 | 12/2008 | Bireley et al. |
| 2013/0132148 | A1* | 5/2013 | Trummer ........... G06Q 10/0633 |
| | | | 705/7.27 |
| 2013/0332935 | A1* | 12/2013 | Varma et al. .................. 718/104 |

OTHER PUBLICATIONS

Paulson, L.D., "IBM Seeks to Unify Data-Access Approaches", Computer, vol. 36, Iss. 3, Mar. 2003, p. 22.

University of Manchester, "Appendix E: Programmatic SQL", [online], located on May 25, 2007, retrieved from the Internet at <URL: http://intranet.cs.man.ac.uk/study_subwab/Ugrad/coursenotes/CS2312/programming.pdf>, 38 pp.

U.S. Appl. No. 11/549,196, filed Sep. 28, 2007, entitled "Generating Information on Database Queries in Source Code into Object Code Compiled from the Source Code", invented by W.R. Bireley, D.E. Blevins, S.A. Brodsky, J. Chakravorty, A. Dawra, S.A. Demir, and S. Gounder.

Purdy et al., "Integrating an Object Server With Other Words", ACM Transactions on Office Information Systems, vol. 5, No. 1, Jan. 1987, pp. 27-47.

Grimm et al., "System Support for Pervasive Applications", ACM Transactions on Computer Systems, vol. 22, No. 4, Nov. 2004, pp. 421-486.

Fraternali, "Tools and Approaches for Developing Data-Intensive Web Applications: A Survey", ACM Computing Surveys, vol. 31, No. 3, Sep. 1999, pp. 227-263.

Dourish, "Using Metalevel Techniques In A Flexible Tool Kit For CSCW Apllications", ACM Transactions on Computer-Human Interaction, vol. 5, No. 2, Jun. 1998, pp. 109-155.

Final Office Action 3, dated Jul. 14, 2011, for U.S. Appl. No. 11/767,451, Total 28 pp.

Amendment 1, dated Oct. 13, 2009, for U.S. Appl. No. 11/767,451, Total 17 pp.

Amendment 2, dated Apr. 7, 2010, for U.S. Appl. No. 11/767,451, Total 20 pp.

Amendment 3, dated Aug. 25, 2010, for U.S. Appl. No. 11/767,451, Total 18 pp.

Amendment 5, dated Dec. 6, 2010, for U.S. Appl. No. 11/767,451, Total 19 pp.

Amendment 6, dated Dec. 14, 2010, for U.S. Appl. No. 11/767,451, Total 20 pp.

Final Office Action 1, dated Jan. 7, 2010, for U.S. Appl. No. 11/767,451, Total 22 pp.

Final Office Action 2, dated Oct. 5, 2010, for U.S. Appl. No. 11/767,451, Total 22 pp.

Office Action 1, Jul. 13, 2009, for U.S. Appl. No. 11/767,451, Total 50 pp.

Office Action 3, dated May 25, 2010, for U.S. Appl. No. 11/767,451, Total 19 pp.

Office Action 5, dated Feb. 9, 2011, for U.S. Appl. No. 11/767,451, Total 23 pp.

Preliminary Amendment 1, dated Jan. 23, 2008, for U.S. Appl. No. 11/767,451, Total 8 pp.

Supplemental Amendment 4, dated Sep. 27, 2010, for U.S. Appl. No. 11/767,451, Total 19 pp.

Advisory Action, dated Oct. 7, 2011, for U.S. Appl. No. 11/767,451, filed Jun. 22, 2007 by W.R. Bireley et al., Total 2 pp [57.148 (AdvAct)].

Notice of Allowance 1, dated Nov. 17, 2011, for U.S. Appl. No. 11/767,451, filed Jun. 22, 2007 by W.R. Bireley et Total 27 pp. [57.148 (NOA1)].

Advisory Action for U.S. Appl. No. 11/767,451, dated Dec. 14, 2010, 3 pp.

Response to Final Office Action 3 for U.S. Appl. No. 11/767,451, dated Sep. 21, 2011, 12 pp.

Response to Final Office Action 3 for U.S. Appl. No. 11/767,451, dated Oct. 14, 2011, 12 pp..

Response to Office Action 5 for U.S. Appl. No. 11/767,451, dated May 9, 2011, 18 pp.

* cited by examiner

APPARATUS, SYSTEM, AND METHOD FOR DATABASE MANAGEMENT EXTENSIONS

BACKGROUND OF THE INVENTION

Field of the Invention

This invention relates to database accesses and more particularly relates to tracking context related to database accesses.

Description of the Related Art

Databases are used the world over to track information. Databases track credit card transactions, customer loyalty heuristics, payroll related information and so forth. The reliability of database accesses affects people's credit ratings and their bank accounts. Preferably, each database transaction accurately executes a desired transaction and accurately updates a database according to the desired transaction.

However, the applications that are used to track database information make mistakes. They may use transactions incorrectly so that they result in deadlocks or timeouts and consequently inaccurately reflect the intended database change. They may track database information with overly complex statements that use up too many resources on a database and fail for that reason. Human errors may also corrupt database information. For example, an airline reservation system does not commit a seat reservation for hours and subsequently blocks this seat for other customers. Another example, a point of sale operator may intend to charge a customer $20.00 for a purchase and may, through a keypad error, charge a customer $200.00. Such an error may cost a consumer $180. The database may reflect the entered transaction, but the entered transaction itself may be incorrect.

A database operator must track down the source of database errors, regardless of whether the error was caused by a human error or otherwise. In a typical database transaction, a database client application may request information from a database. The client and the database may reside on distinct computer systems. An intranet, Internet or other network may provide network transport between the client and the database. While a database may detect a questionable transaction, the database is often not able to gather information from the user, the application developer, and the database operator to track down the source of the error, particularly when the error is in the software operating on the client.

From the foregoing discussion, it should be apparent that a need exists for an apparatus, system, and method that coordinate database transaction tracking across multiple computer systems. Beneficially, such an apparatus, system, and method would provide a user, an application developer, a database developer and a database operator with valuable tools for analyzing and tracking the source of database errors.

SUMMARY OF THE INVENTION

The present invention has been developed in response to the present state of the art, and in particular, in response to the problems and needs in the art that have not yet been fully solved by currently available apparatuses, systems, and methods for evaluating database accesses. Accordingly, the present invention has been developed to provide an apparatus, system, and method for evaluating database accesses that overcome many or all of the above-discussed shortcomings in the art.

The apparatus to accomplish the evaluation of database accesses is provided with a plurality of modules configured to functionally execute the necessary steps to accomplish database access evaluation. These modules in the described embodiments include a client application module, database module, an application policy, a database policy, a context point module, a detection point module, profiling data, quality of service thresholds, and quality of service results.

The apparatus, in one embodiment, is configured to exchange profiling data between a client application module and a database module. The profiling data may comprise a set of quality of service thresholds and corresponding quality of service results related to a client database access. The apparatus further determines a database access policy violation at a detection point module. The detection point module may comprise one of the client application module and the database module. The database access policy violation comprises a database access that violates one of an application policy and a database policy. The database access policy violation may simply define requirements for action to be taken following a detected condition. Determining a database access policy violation compares quality of service results with the profiling data and selectively requests context information from a context point module, in response to the database access policy violation. The context point module may comprise one of the client application module and the database module. The detection point module and the context point module are distinct modules.

In a further embodiment, the apparatus is further configured, in one embodiment, to alert one of the client application module and the database module of the database access policy violation in conjunction with satisfying the client database access.

In a further embodiment, the apparatus is further configured such that the request for context information is synchronous while the response containing context information is asynchronous request to the context point module.

In a further embodiment, the apparatus is further configured such that the request for context information is synchronous while the response containing context information is a synchronous request to the context point module.

In a further embodiment, the apparatus is further configured such that determining a database access policy violation further comprises determining whether the quality of service results satisfy the set of quality of service thresholds.

In a further embodiment, the apparatus is further configured such that the quality of service thresholds and quality of service results service results are associated measurements related to a client database access at the detection point module.

In a further embodiment, the apparatus is further configured such that the measurements include one or more of I/O device latency, resource serialization times, network latency, and CPU utilization.

In a further embodiment, the apparatus is further configured such that the set of quality of service thresholds is defined prior to execution of the computer program product, the set of quality of service thresholds embedded into the computer program product for use at the detection point module. The set of quality of service thresholds may be used by one of the client application module and the database module.

In a further embodiment, the apparatus is further configured such that the context information comprises runtime parameters associated with the context point module including a program locator value associated with the context point module.

In a further embodiment, the apparatus is further configured such that the runtime parameters comprise database call parameters selected from a group of runtime parameters. The group of runtime parameters may consist of database access time, a program call stack trace, a source code line number, a database name, a database application identifier, a database transaction identifier, a Java class name, a Java method name, a Java object name, central processing unit (CPU) load statistics, network load statistics, a response time value for the database access, a group response time value for a plurality of database accesses, amount of data retrieved, and names of applications currently executing on a CPU.

In a further embodiment, the apparatus is further configured such that determining a database access policy violation comprises comparing quality of service results to a corresponding set of quality of service thresholds and identifying a database access policy violation in response to at least one unsatisfied quality of service threshold.

An apparatus of the present invention is also presented for evaluating database accesses. The apparatus comprises a database module configured to control read, write, update, and delete access to a database. A detection point module is configured to monitor quality of service results related to a database access request. A client application module is configured to initiate a database access request to access data controlled by the database module. A context point module is configured to provide context information (synchronously or asynchronously) in response to a synchronous context information request. Finally, a database policy module is configured to compare the quality of service results to a set of quality of service thresholds specific to the detection point module and to signal a database access policy violation to the client application module in response to the quality of service results failing to satisfy at least one member of the set of quality of service thresholds. The context point module records context information for at least the database module in response to the signal from the database policy module.

In a further embodiment, the apparatus is further configured such that the set of quality of service thresholds are included in the context information request.

In a further embodiment, the apparatus is further configured such that the quality of service thresholds and quality of service results are associated with I/O device activity related to a database access at the detection point module.

In a further embodiment, the apparatus is further configured such that the quality of service thresholds and quality of service results are associated with response time including concurrency information such as a lock wait time and actual time of CPU utilization times related to a database access.

In a further embodiment, the apparatus is further configured such that the quality of service thresholds and quality of service results are associated with network latency utilization related to a database access.

In a further embodiment, the apparatus is further configured such that the set of quality of service thresholds is defined prior to the execution of the computer program product, the set of quality of service thresholds embedded into the computer program product for use at the detection point module by one of the client application module and the database module. The quality of service thresholds may also be defined dynamically during execution of the computer program. The thresholds may be embedded in the apparatus or stored externally for access by the detection point module.

In a further embodiment, the apparatus is further configured such that the context information comprises runtime parameters associated with the context point module including a program locator associated with the context point module.

A system of the present invention is also presented to evaluate database accesses. The system, in one embodiment, includes a computer network, a computing device, a database application. The computing device connects to the computer network and is configured to execute software applications. The database application executes on the computing device. The database application comprises: a database module configured to control read, write, update, and delete access to data, a detection point module configured to monitor quality of service results related to a database access request, and a database policy module comprising profiling data comprising a set of quality of service thresholds and corresponding quality of service results related to a client database access. The database policy module evaluates database accesses according to the set of quality of service thresholds and the quality of service results. A database software client executes on a second computing device and executes a database access to the database module over the network. The second computing device also connects to the computer network. The detection point module detects quality of service results related to the database access. The business logic of the database policy module detects an access policy violation in response to at least one quality of service result failing to satisfy at least one member of the set of quality service thresholds and notifies the database software client of the policy violation. The database software client records runtime parameters specific to the database access in response to the notification by the business logic.

A method of the present invention is also presented for evaluating database accesses. The method in the disclosed embodiments substantially includes the steps necessary to carry out the functions presented above with respect to the operation of the described apparatus and system. In one embodiment, the method includes, at a detection point module for a database, recording quality of service results for a database access. The method further compares the quality of service results with a set of quality of service thresholds. The method further determines that a database access policy violation has occurred based on the quality of service results failing to satisfy the set of quality of service thresholds. Finally, the method records runtime parameters associated with the database access, wherein the runtime parameters are recorded at a context point module.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
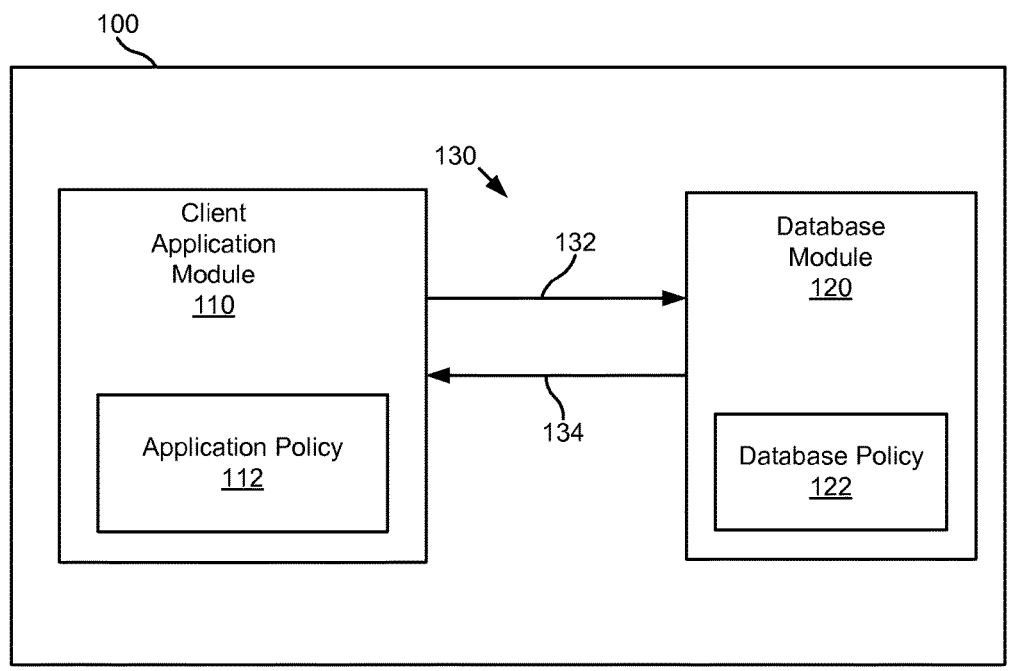
FIG. 1 is a block diagram of one embodiment of a system of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer program of a computer useable medium and useable by a computer as part of a computer program product program may take any form capable of generating a signal, causing a signal to be generated, or causing execution of a program of machine-readable instructions on a digital processing apparatus. A computer readable medium may be embodied by random access memory, read only memory, flash memory, a transmission line, a compact disk, digital-video disk, a magnetic tape, a Bernoulli drive, a magnetic disk, a punch card, integrated circuits, custom VLSI circuits, gate arrays, or other digital processing apparatus memory devices or other devices capable of directing, modifying, or otherwise providing input to the processing of a digital processing apparatus.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts a client server database 100 consistent with the present invention comprising a client application module 110 and a database module 120. The system 100 allows client application modules 110 to access information in a database module 120. The system 100 allows a system operator to track database accesses across the entire system 100. In addition, the system 100 allows the client application module 110 and/or the database module 120 to detect database anomalies and exchange information with each other to assist a system operator in tracking down the source of the database anomalies. A database anomaly may be a database error or an entry in the database that is flagged for further analysis. A policy violation indicates that one or more anomalies are significant enough to flag as a policy violation.

Database anomalies may be created by human error, by network errors, by computing device failures, by software errors, by high traffic, by inefficient database access calls, or by other sources. Database anomalies include slow response times for one or more database accesses. An access policy violation occurs when the measured results related to an anomaly do not meet certain thresholds. The thresholds may include expected response times, expected results, and other expectations related to one or more database accesses. The system 100 flags such anomalies as violations of a database policy. The system 100 may take required actions as a result of a violation of a database policy.

For purposes of this application, a database access may be a database read command, a database write command, a database delete command, or a database update command. A database access may comprise a database request 132 (a flow from the client application module 110 to the database module 120) and a database response 134 (a flow from the database module 120 to the client application module 110 in response to a database request 132). A database transaction 130 may comprise one or more database requests 132 and/or one or more database responses 134.

The client application module 110 may be termed a database client, a database software client, a client application, or other similar entity. The client application module 110 may reside on the same computer system as the database module 120. However, in many circumstances, the client application module 110 and the database module 120 run on distinct computer systems.

As an example, a client application module 110 may be an Automated Teller Machine (ATM) application running on an ATM computer system. In this example, the client application module 110 accesses a database module 120 comprising a relational transactional database such as DB2 from IBM (International Business Machine) at a central bank computing center. The ATM client application module 110 makes database requests 132 across a computer network to the database module 120 and receives database responses 134 from the database module 120 over the computer network.

Typically, the client application module 110 comprises an application policy 112. The application policy 112 specifies various parameters in which the client application module 110 is expected to operate. The application policy 112 further describes actions to be taken by the client application module 110 depending on database quality of service results. For example, the client application module 110 may request log or trace information from the database module 120 in response to receiving a database response 134 that fails to meet expectations or a database response 134 that constitutes a hang.

The database module 120 provides transactional database services typical of a modern database such as IBM's IMS, IBM's DB2, an Oracle database system, Microsoft SQL Server, or other database. The database module 120 may run on a single computer or may run on a combination of multiple computers such as a mainframe sysplex or a partitioned environment running on multiple nodes. The database module 120 responds to database requests 132 and sends database responses 134 back to the client application module 110. The database module 120 tracks database transactions 130, logs database accesses and tracks various data related to each database transaction 130.

The database module 120 typically comprises a database policy 122. The database policy 122 comprises information related to expected database access parameters. The database policy 122 may further comprise business logic and actions to be taken depending on parameters and measured results associated with a database access when compared against the expected database access parameters and expected results.

Figure 2:
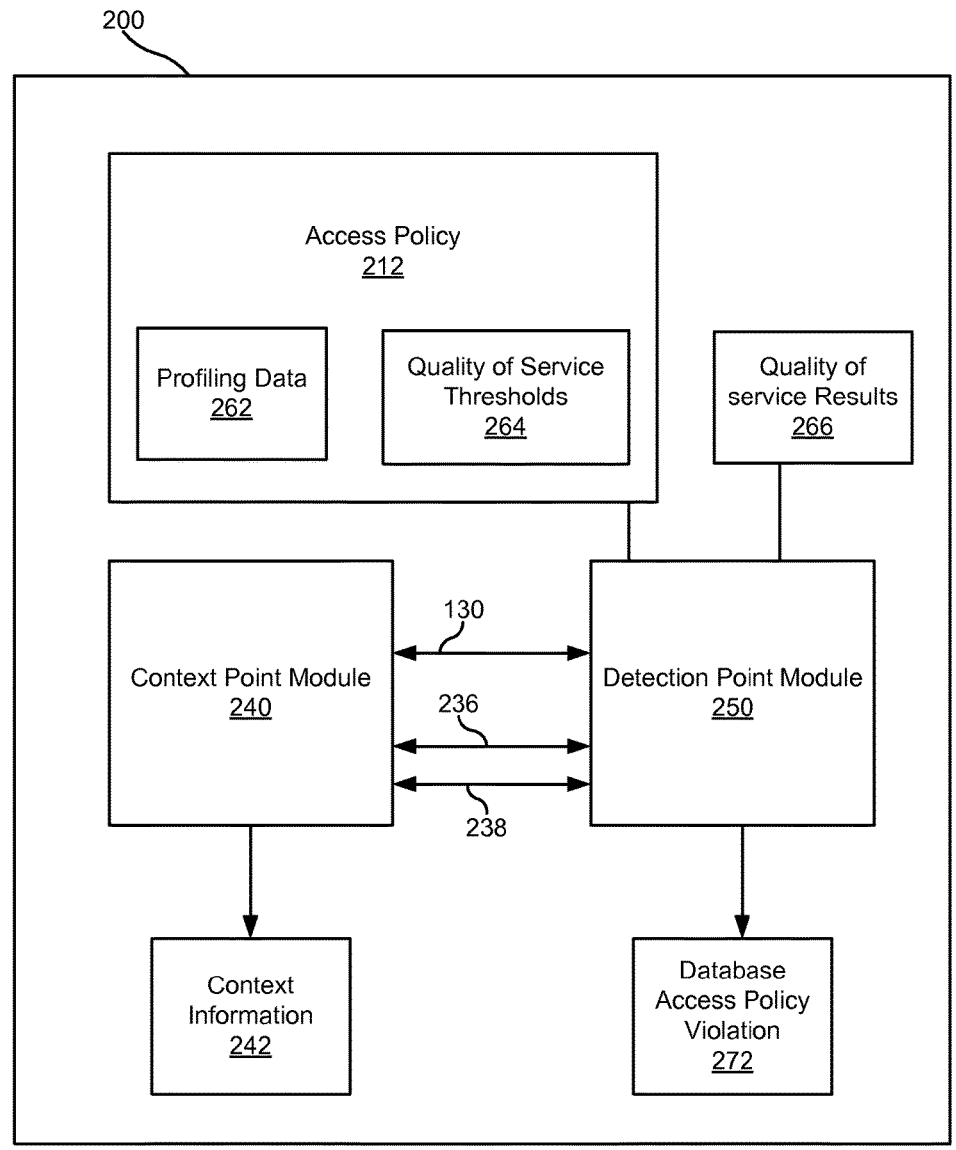
FIG. 2 shows an alternative view of a block diagram of one embodiment of the present invention.

FIG. 2 depicts a client server database 200 of the present invention, similar to the system 100 of FIG. 1. The system 200 comprises a context point module 240 and a detection point module 250. For a specific example, a client application module 110 may take on the role of either a context point module 240 or a detection point module 250. Similarly, a database module 120 may take on the role of either a context point module 240 or a detection point module 250. Thus, a database request 132 (See FIG. 1) may initiate from a context point module 240 or from a detection point module 250 and a database response 134 (See FIG. 1) may be sent from a context point module 240 or a detection point module 250.

A context point module 240 maintains and/or stores context information for each database transaction 130 that flows through the given context point module 240. Thus, if context point module 240 serves to initiate a database request 132, the context point module 240 may store log information concerning the time of the database request 132, the software module that issued the database request 132, the format of the database request 132 such as an SQL (structured query language) query, and so forth. The context point module 240 stores this information as context information 242 for database transactions 130 passing through the context point module 240. Alternatively, the context point module 240 may send the context information 242 with the database request flow 132. In some embodiments, the context point module 240 may send a locator on the database request flow 132. The locator may simply comprise an index, an address, or other information to locate the context information 242.

The detection point module 250 services a database request 132 or database response 134. The detection point module 250 determines whether the database request 132 or database response 134 satisfy certain expectations defined in the access policy 212. The detection point module 250 tracks statistical data associated with a database access such as the format of the request, the number of bytes requested, the access time, repetitive accesses for the same data, the time of the access, the response time for each access, the name of the requesting software module, transaction identifiers, and so forth. The detection point module 250 has access to the access policy 212. References to response time include response time as measured from the perspective of a client application module 110, a database module 120, or a combination thereof. Response time may refer to any discrete portion of the overall response time such as the lock wait time, network delay, actual CPU utilization, I/O device latency or other portions of the overall response time.

The access policy 212 corresponds to either the application policy 112 or the database policy 122 of FIG. 1 depending on whether the detection point module 250 is a client application module 110 or a database module 120, respectively. The access policy 212 comprises profiling data 262 and quality of service thresholds 264. The profiling data 262 comprises various predicted results for any given database access. The profiling data 262 may relate to parameters measurable on either a client application module 110 or a database module 120 or both. For example, the profiling data may predict that a particular database access from a client application module 110 should take no more than 500 milliseconds. Similarly, the profiling data may predict that the same access as measured by a database module 120 should take no more than 200 nanoseconds. In this example, the expected access time for the client application module 110 takes into account the network delay associated with the access while the expected access time for the database module 120 does not include a network delay.

The access policy 212 may further comprise quality of service thresholds 264. The quality of service thresholds 264 may specify, for each expected result in the profiling data 262, tolerances that may be greater or less than the expected results of the profiling data 262.

The detection point module 250 measures actual results for each database access that passes through the detection point module 250. The detection point module 250 compiles the actual measured results as quality of service results 266. Some quality of service results 266 are simply statistical in nature. Other results 266 may include heuristics such as repetitive accesses, redundant accesses, patterns of access, and the like. Quality of service results may convey the current state of a database module 120 or a client application module 110. For example, a client application module 110 may include information that indicates that the current trace state. A database module 120 may send a signal to the client application module 110 indicating that tracing is to be turned on. The quality of service results 266 need not relate directly to a database request 132. The quality of service results 266 may record the general context of the network, the system or the database. For example, a high CPU utilization level included in the quality of service results 266 may be accessed from a database module 120. The database module 120 may signal to client application modules 110 that database requests 132 are to be curtailed or terminated for a period of time.

The detection point module 250 compares the quality of service results 266 to the profiling data 262 and the quality of service thresholds 264 to determine if a particular database access fails to meet the standards of the access policy 212. Some quality of service thresholds 264 may simply comprise binary conditions. Other quality of service thresholds 264 may comprise granular qualitative parameters. For those database accesses that fail to meet the access policy 212, the detection point module 250 creates a database access policy violation 272. The database policy violation 272 may simply define requirements for action to be taken following a detected condition. The detection point module 250 may request context information 242 from the context point module 240 related to the particular database access by sending a context information request 236 to the context point module 240. The detection point module 250 may use a transaction identifier or other index to identify to the context point module 240 the particular context information 242 that is desired. The context point module 240 may send context information 242 back to the detection point module 250 with a context information response 238.

The context module 240 may include various layers of an application environment. For example, a database client application may interface with a runtime support module which in turn may interface with operating extensions, an operating system, network drivers, database drivers, and so forth. The context module 240 may include parts of all of these layers. A system 100 may be designed in which logging, measuring, and notifying is handled by a database client application or by database connector software, by operating system extensions, by runtime support modules or combinations of these. Similarly, the detection point module 250 may include various operating system and application layers including a, a database driver, operating system extensions, and runtime support modules. The various modules and layers of the detection point module 250 may operate independently or in concert to carry out the function of the detection point module 250.

Figure 3A:
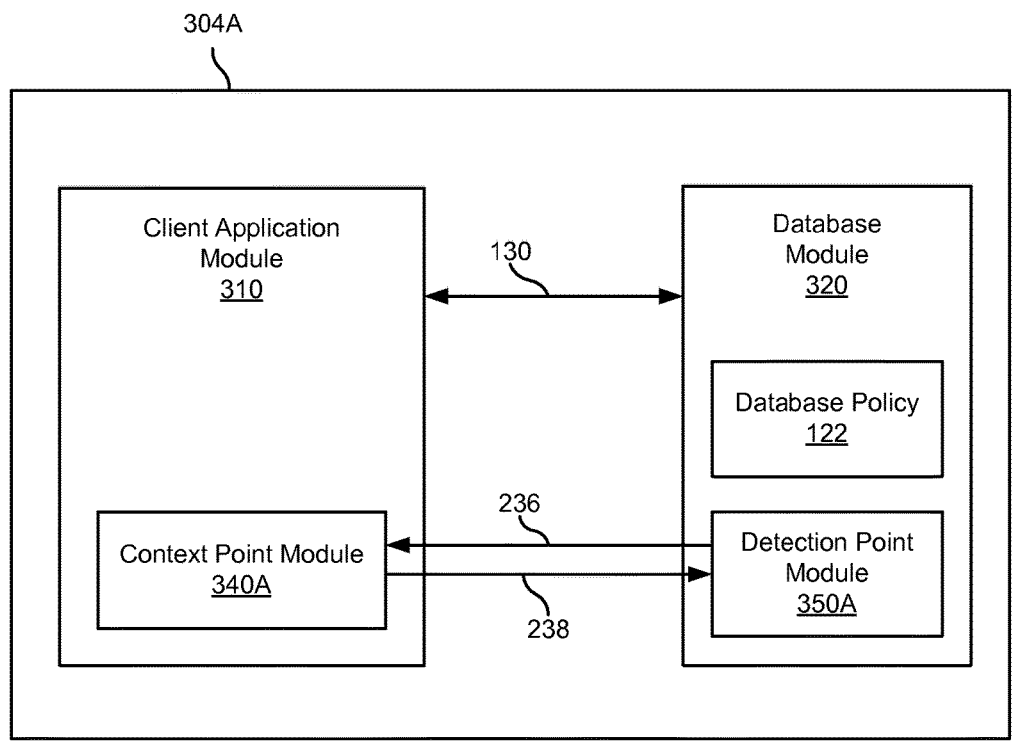
FIG. 3A shows a block diagram of one embodiment of the present invention.

FIG. 3A depicts one embodiment of a client server database 304A consistent with the present invention. The system 304A comprises a client application module 310 and a database module 320. The client application module 310 of system 304A comprises as a context point module 340A and the database module 320 comprises as a detection point module 350A. In this embodiment, the client application module 310 stores context information 242 about each database transaction 130. The detection point module 350A of the database module 320 detects quality of service results 266 that fail to meet the database policy 122. In response to detecting a quality of service failure, the detection point module 350A may generate a database access policy violation 272 and may send a context information request 236 to the context point module 340A. The context point module 340A may in turn reply with a context information response 238.

As an example, an ATM client system may request an account balance from a central database. The ATM client system may record initial request time, the format of the request message, the module name in the ATM system that makes the request, the hexadecimal offset in the module from which the request is made, a transaction identifier for the request, and a customer name. The recorded information may comprise the context information 242. The central database may receive the request and respond to the request. The ATM client system receives the response and notes the elapsed time for the response as well as other parameters. The database may detect an anomaly related to the request and may in turn request the context information 242 from the ATM client system. In this manner, the database is able to query remote systems for context information 242 to assist in tracking down the source of network delays, database delays, database errors, and the like.

Figure 3B:
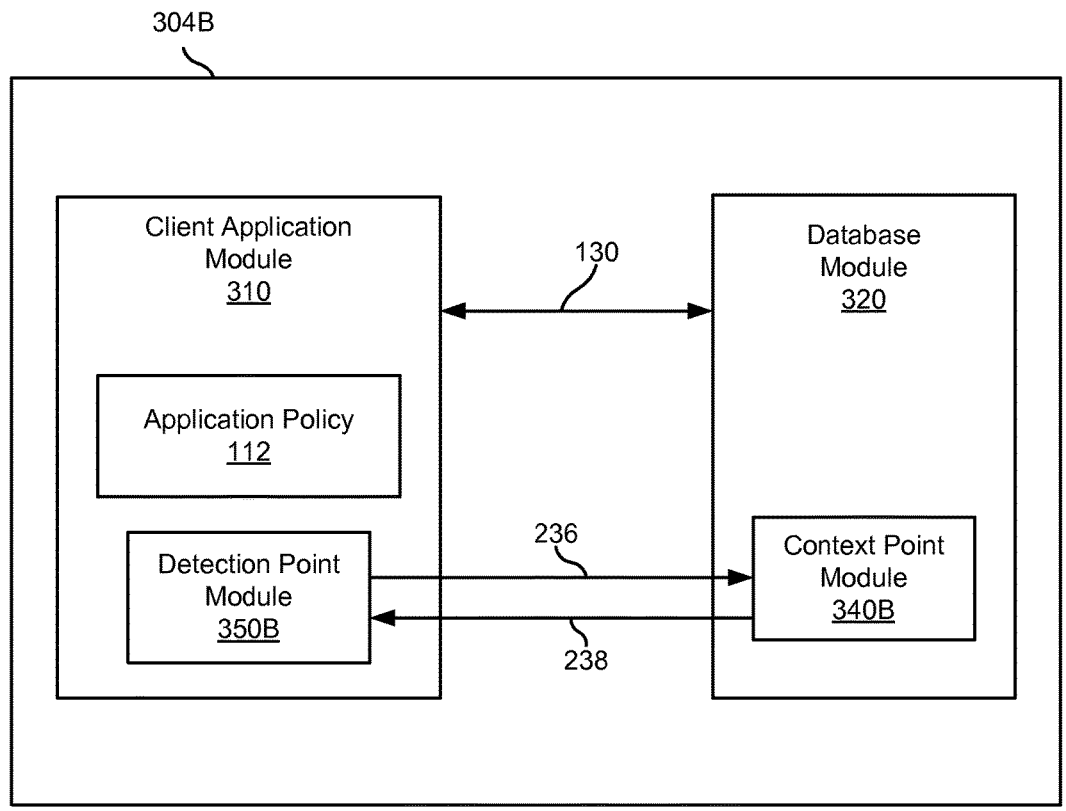
FIG. 3B shows a block diagram of one embodiment of the present invention.

FIG. 3B depicts an alternative embodiment of a client server database 304B in which the client application module 310 comprises the detection point module 350B and the database module 320 comprises the context point module 340B. The detection point module 350B of system 304B accesses application policy 112 to determine if a database access policy violation 272 has occurred. If a policy violation is detected, then detection point module 350B may generate a context information request 236 and receive a context information response 238 from the database module 320 comprising context information 242 related to the database transaction 130 that raised the database access policy violation 272.

Using the previous example, the ATM client system may determine that the response time for a particular database access exceeds expectations or that the data returned does not meet certain policy expectations. The ATM client system may then request context information 242 from the central database. This example illustrates that the ATM client system may act as a context point module 240 and a detection point module 250 in the same database transaction. Importantly, a context point module 240 records context information 242 that may be used by a remote system upon request. Also, a context point module 240 may deliver remote context information 242 as a matter of routine, without a request being made.

Figure 4:
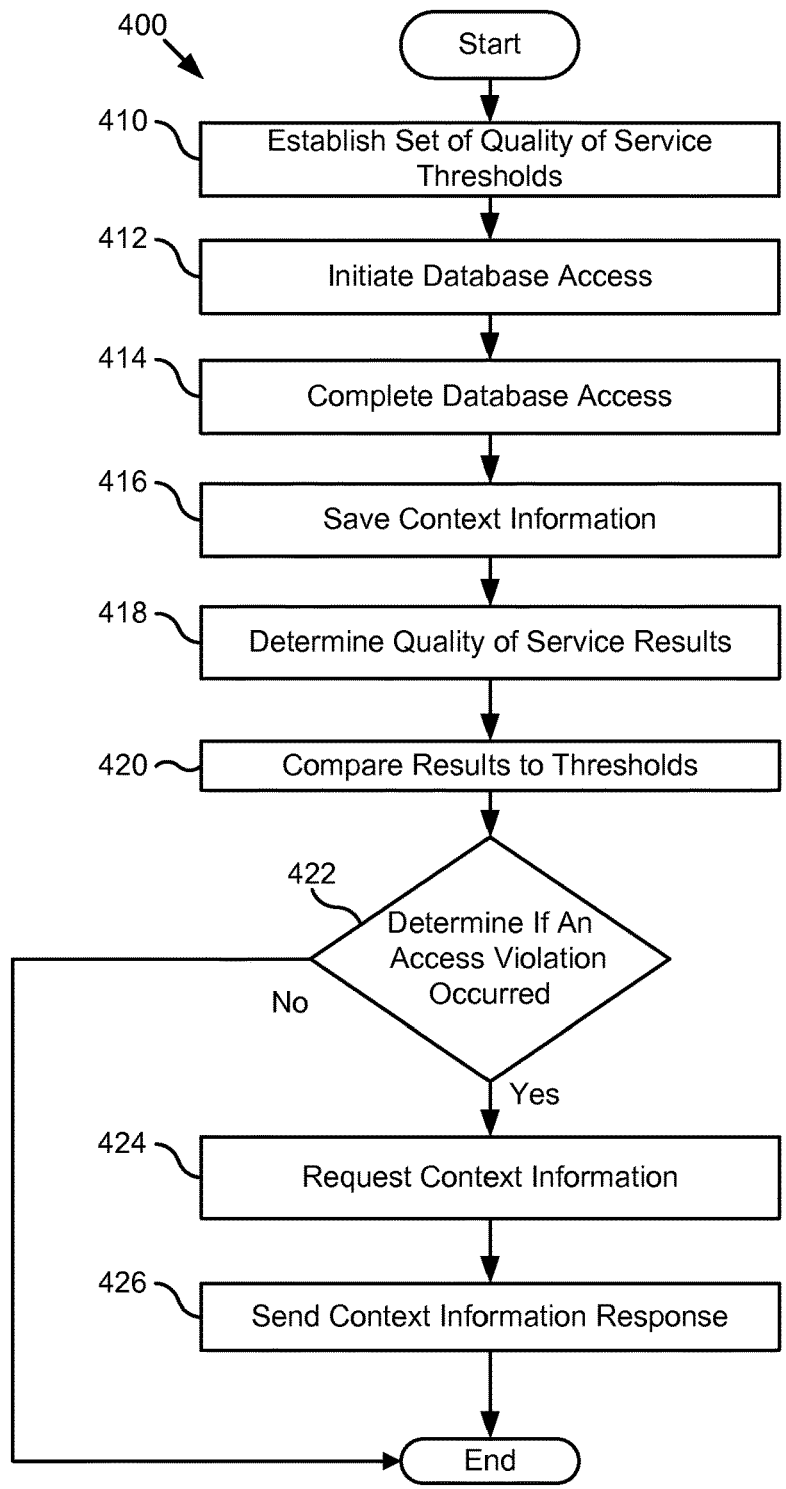
FIG. 4 is a flow diagram illustrating one embodiment of a method of the present invention.

FIG. 4 depicts a flowchart illustrating one embodiment of a method 400 consistent with one embodiment of the present invention. The method 400 comprises various steps to implement the method of the invention. The illustrated order of the steps is simply one embodiment as the steps may be performed in other orders. For example step 416 could be executed prior to step 414.

The method 400 comprises establishing 410 a set of quality of service thresholds 264. The quality of service thresholds 264 may be determined prior to the implementation of the system 100. For example, a database developer may determine that for a typical SQL query executed on the system of the database module 120, the expected response time is 100 ms. The 100 ms response time may be determined through empirical data and is an example of profiling data 262. Alternatively, establishing 410 the set of quality of service thresholds 264 may comprise defining specifications for an application. For example, the specifications for an application that returns information to a customer service representative in real time while customers are waiting on the phone may require that individual queries take no more than 1000 ms. However, the specifications for the generation of a complex monthly report in a database warehouse may allow for several hours.

The set of quality of service thresholds 264 incorporates the measured profiling data 262 and may further incorporate margins of error. For example, the 100 ms response time for a database access may be adjusted to 110 ms as part of a set of quality of service thresholds 264. The larger value may allow for some variation when measuring actual data. The developer's expectations may then be compiled as one element of a set of quality of service thresholds 264.

In another example, the response time for the same SQL query executed from a client application module 110 over a network may be estimated to be 220 ms, including the actual database query and the network delay. The set of quality of service thresholds 264 may include expected response times for various types of database queries, recovery times following various types of database errors, network delay times, I/O device latency and so forth. The quality of service thresholds 264 may incorporate current network bandwidth and I/O device latency to accurately predict network usage.

By providing quality of service thresholds 264, a database developer provides expected efficiency levels for all database accesses. A line of code written by a novice developer that inefficiently accesses a database may be detected early when the new line of code fails to meet expected quality of service thresholds 264. Thus, the quality of service thresholds 264 may be incorporated into the compiled code of the client application module 110 and the database module 120. Alternatively, the quality of service thresholds 264 may be determined dynamically during execution of the computer program. The quality of service thresholds 264 may be embedded in the computer program product or defined externally for use at the detection point module 250. Also, the quality of service thresholds 264 may be determined long before the actual product is compiled.

In one embodiment of the invention, the quality of service thresholds 264 are integrated into the source code and the compiler of a programming language as language-integrated data server management extensions. The compiler interprets database queries that are coded into a source code file and generates additional source code and/or compiled code. The additionally generated code may optimize poorly written database access code or add additional parameters to database access code such as access plan hints a query optimizer. The generated code may also insert profiling data 262 and/or quality of service thresholds 264 into the source code and the compiled code. The generated code may further use the inserted profiling data 262 and quality of service thresholds 264 to evaluate database accesses and to exchange expected performance results between the context point module 240 and the detection point module 250. The compiler may generate code that incorporates into the context information 242 the code module names, source code line numbers at which database calls are made, and the like.

The method 400 further comprises initiating 412 a database access. Generally, a client application module 110 initiates the database access. Either the client application module 110 or the database module 120 may act as a context point module 240 or a detection point module 250.

The method 400 further comprises completing 414 the database access. The context point module 240 saves 416 the context information 242 related to the current database access. The context information 242 may be stored in a log file associated with the context point module 240 or stored remotely. Alternatively, the context information 242 may be sent as part of a database request 132. In some embodiments, the database request 132 may contain a locator that indicates where the context information 242 may be accessed.

The detection point module 250 determines 418 quality of service results 266 for the database access. The detection point module 250 compares 420 the quality of service results 266 to the quality of service thresholds 264. The detection point module 250 utilizes the access policy 212 to determine 422 whether to generate a database access policy violation 272 based on the quality of service results 266, the profiling data 262 and the quality of service thresholds 264.

In response to determining 422 that a database access policy violation 272 has occurred, the detection point module 250 requests 424 context information 242 from the context point module 240. The context information request 236 is synchronous while the context information response 238 may be synchronous or asynchronous. A synchronous response 238 must complete prior to the initiation of subsequent flows while an asynchronous response 238 need not complete prior to the initiation of subsequent flows.

The context point module 240 sends 426 a context information response 238 in response to the context information request 236. The context point module 240 may extract a transaction identifier from the context information request 236 to determine the appropriate context information 242 to send in the context information response 238.

The detection point module 250 may optionally store the data from the context information response 238 into its own log file to assist service personnel in debugging any anomalies detected by the detection point module 250. In this manner, the context information 242 for a single database transaction saved on a remote location such as a client application module 110 or a database module 120 may be requested and received at a detection point module 250, enabling debugging of an anomalous database access with context information from a remote location.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer readable storage medium having a computer program for evaluating a database access of a database, wherein the computer program when executed on a computer causes the computer to perform operations, the operations comprising:

maintain profiling data comprising predicted results for particular types of database queries, wherein different types of database access have different predicted results;

provide, for each database query type of a plurality of database query types, a set of quality of service thresholds providing different expected efficiency levels for the database query type;

provide an access policy including the quality of service thresholds related to predicted results concerning parameters involving execution of database queries, wherein the quality of service thresholds are based on the profiling data related to parameters measured from the database queries and an incorporated margin of error with respect to the profiling data;

measure results of database access parameters related to execution of a database query, a format of the database query, and the computer in which the database query is executed;

determine a database access policy violation by determining whether the measured results of the database query satisfy at least one of the quality of service thresholds for a database query type of the database query, wherein the database access policy violation indicates that the measured results have significant database anomalies created by at least one of human errors, network errors, computing device failures, software errors, high traffic, and inefficient database access calls;

request context information for the database query that resulted in the database access policy violation from a context point module, wherein the context information comprises a time of the database query and at least one of a software module that issued the database query and a format of the database query;

receiving the requested context information on the database query that resulted in the database access policy violation; and selecting whether to store the received context information into a log file to debug anomalies for the database query.

2. The computer readable storage medium of claim 1, further configured to alert one of a client application module and a database module of the database access policy violation in conjunction with satisfying the database query.

3. The computer readable storage medium of claim 1, wherein the request for context information is a synchronous request and the context information is returned by the context point module.

4. The computer readable storage medium of claim 1, wherein the quality of service thresholds and the measured results are associated with input/output device activity related to the database query.

5. The computer readable storage medium of claim 1, wherein the quality of service thresholds and the measured results are associated with one or more of concurrency information, network latency, and CPU utilization.

6. The computer readable storage medium of claim 1, wherein the quality of service thresholds and the measured results are associated with network latency related to the database query.

7. The computer readable storage medium of claim 1, wherein the quality of service thresholds are defined prior to execution of the computer program, and wherein the quality of service thresholds are embedded into the computer program for use at a detection point module.

8. The computer readable storage medium of claim 1, wherein the context information comprises runtime parameters associated with the context point module including a program locator value associated with the context point module.

9. The computer readable storage medium of claim 8, wherein the requesting the context information comprises:
    querying a remote system for the context information related to the database query.

10. The computer readable storage medium of claim 8, wherein the runtime parameters comprise database call parameters selected from a group consisting of a database access time, a program stack trace, a source code line number, a database name, a database application identifier, a database transaction identifier, a Java class name, a Java method name, a Java object name, central processing unit (CPU) load statistics, network load statistics, a response time value for the database access, a group response time value for a plurality of database accesses, amount of data retrieved, Java runtime container statistics, and names of applications currently executing on a CPU.

11. The computer readable storage medium of claim 10, wherein determining the database access policy violation comprises comparing measured results to a corresponding quality of service thresholds and identifying the database access policy violation in response to at least one unsatisfied of the quality of service thresholds.

12. An apparatus to evaluate database accesses, the apparatus comprising:

a database module configured to control access to a database;

a detection point module configured to measure results of a database access;

an application module configured to initiate a database access to the database;

a context point module configured to provide context information in response to a synchronous context information request, an access policy including: profiling data comprising predicted results for particular types of database queries, wherein different types of database access have different predicted results;

for each database query type of a plurality of database query types, a set of quality of service thresholds providing different expected efficiency levels for the database query type; and quality of service thresholds related to predicted results concerning parameters involving execution of database queries, wherein the quality of service thresholds are based on the profiling data related to parameters measured from the database queries and an incorporated margin of error with respect to the measured profiling data;

wherein the detection point module is further configured to:

measure results of database access parameters related to execution of a database query, a format of the database query, and a computer in which the database query is executed;

determine a database access policy violation by determining whether the measured results of the database query satisfy at least one of the quality of service thresholds for a database query type of the database query, wherein the database access policy violation indicates that the measured results have significant database anomalies created by at least one of human errors, network errors, computing device failures, software errors, high traffic, and inefficient database access calls;
requesting context information for the database query that resulted in the database access policy violation from the context point module, wherein the context information comprises a time of the database query and at least one of a software module that issued the database query and a format of the database query;
receiving the requested context information on the database query that resulted in the database access policy violation; and
selecting whether to store the received context information into a log file to debug anomalies for the database query.

13. The apparatus of claim 12, wherein the requesting the context information comprises:
querying a remote system for the context information related to the database query.

14. The apparatus of claim 12, wherein the quality of service thresholds are included in the context information request.

15. The apparatus of claim 12, wherein the quality of service thresholds and the measured results are associated measurements related to a database query at the detection point module.

16. The apparatus of claim 15, wherein the measured results are measurements of response time related to the database query.

17. The apparatus of claim 15, wherein the measured results are measurements of network latency related to the database.

18. The apparatus of claim 17, wherein the quality of service thresholds are defined prior to execution of the database, wherein the quality of service thresholds are for use at the detection point module by one of the application module and the database module.

19. The apparatus of claim 18, wherein the context information comprises runtime parameters associated with the context point module including a program pointer locator value associated with the context point module.

20. A system configured to evaluate database accesses, the system comprising:
a computer network;
a first computing device connected to the computer network, the first computing device configured to execute software applications;
a database application executing on the first computing device comprising:
a database module configured to control access to the database,
a detection point module configured to measure results of a database access; and
a database policy module comprising an access policy including:
profiling data comprising predicted results for particular types of database queries, wherein different types of database access have different predicted results;
for each database query type of a plurality of database query types, a set of quality of service thresholds providing different expected efficiency levels for the database query type; and
quality of service thresholds related to predicted results concerning parameters involving execution of the database queries, wherein the quality of service thresholds are based on the profiling data related to parameters measured from the database queries and an incorporated margin of error with respect to the measured profiling data; and
a database software client executing on a second computing device and configured to execute a query for a database query to the database module over the computer network, the second computing device connected to the computer network;
wherein the detection point module measures database query parameters related to the execution of the database query, a format of the database query, and the first computing device, and the first computing device in which the database query is executed;
wherein the database policy module determines a database access policy violation by determining whether the measured results of the database query satisfy at least one of the quality service thresholds for a database query type of the database query, wherein the database access policy violation indicates that the measured results have significant database anomalies created by at least one of human errors, network errors, computing device failures, software errors, high traffic, and inefficient database access calls;
wherein the database software client records runtime parameters specific to the database query in response to notification by the database policy module;
wherein the detection point module further performs:
request context information for the database query that resulted in the database access policy violation from a context point module, wherein the context information comprises a time of the database query and at least one of a software module that issued the database query and a format of the database query;
receiving, by the detection point module, the requested context information on the database query that resulted in the database access policy violation; and
selecting whether to store the received context information into a log file to debug anomalies for the database query.

21. A method implemented in a computer for diagnosing a database access irregularity in a database in a computer readable medium, the method comprising:
maintaining profiling data comprising predicted results for particular types of database queries, wherein different types of database access have different predicted results;
providing, for each database query type of a plurality of database query types, a set of quality of service thresholds providing different expected efficiency levels for the database query type;
providing an access policy including the quality of service thresholds related to predicted results concerning parameters involving execution of the database queries, wherein the quality of service thresholds are based on the profiling data related to parameters measured from the database queries and an incorporated margin of error with respect to the profiling data;
measuring results of database access parameters related to execution of a database query, a format of the database query, and the computer in which the database query is executed;
determining a database access policy violation by determining whether the measured results of the database query satisfy at least one of the quality of service thresholds for a database query type of the database query, wherein the database access policy violation indicates that the measured results have significant database anomalies created by at least one of human errors, network errors, computing device failures, software errors, high traffic, and inefficient database access calls;

requesting context information for the database query that resulted in the database access policy violation from a context point module, wherein the context information comprises a time of the database query and at least one of a software module that issued the database query and a format of the database query;

receiving the requested context information on the database query that requested in the database access policy violation; and selecting whether to store the received context information into a log file to debug anomalies for the database query.

22. The method of claim 21, wherein the requesting the context information comprises:

querying a remote system for the context information related to the database query.

* * * * *